(12) United States Patent
Selinger

(10) Patent No.: US 10,463,974 B2
(45) Date of Patent: Nov. 5, 2019

(54) PERMUTATION GAME

(71) Applicant: Peter Selinger, Halifax (CA)

(72) Inventor: Peter Selinger, Halifax (CA)

(*) Notice: Subject to any disclaimer, the term of this patent is extended or adjusted under 35 U.S.C. 154(b) by 55 days.

(21) Appl. No.: 15/643,394

(22) Filed: Jul. 6, 2017

(65) Prior Publication Data
US 2018/0008896 A1 Jan. 11, 2018

Related U.S. Application Data (60) Provisional application No. 62/359,237, filed on Jul. 7, 2016.

(51) Int. Cl.
| | |
|---|---|
| *A63F 9/00* | (2006.01) |
| *A63F 13/822* | (2014.01) |
| *A63F 13/2145* | (2014.01) |
| *A63F 13/42* | (2014.01) |
| *A63F 13/46* | (2014.01) |
| *A63F 13/63* | (2014.01) |
| *A63F 13/65* | (2014.01) |

(52) U.S. Cl.
CPC ........ *A63F 13/822* (2014.09); *A63F 13/2145* (2014.09); *A63F 13/42* (2014.09); *A63F 13/46* (2014.09); *A63F 13/63* (2014.09); *A63F 13/65* (2014.09); *A63F 2250/28* (2013.01); *A63F 2300/69* (2013.01)

(58) Field of Classification Search
None
See application file for complete search history.

(56) References Cited

U.S. PATENT DOCUMENTS

| | | | | |
|---|---|---|---|---|
| 5,209,480 A | * | 5/1993 | Katz | A63F 9/10 273/157 R |
| 5,643,085 A | * | 7/1997 | Aityan | A63F 9/24 273/153 R |
| 6,672,588 B1 | * | 1/2004 | Kielar | A63F 9/10 273/157 R |
| 2005/0173861 A1 | * | 8/2005 | Yu | A63F 1/00 273/271 |
| 2007/0243919 A1 | * | 10/2007 | Thelen | A63F 9/24 463/9 |
| 2009/0096160 A1 | * | 4/2009 | Lyons, Jr. | A63F 9/10 273/153 R |
| 2012/0025461 A1 | * | 2/2012 | Harris | A63F 3/00643 273/153 R |
| 2012/0025462 A1 | * | 2/2012 | Knowlton | A63F 9/10 273/157 R |
| 2013/0079079 A1 | * | 3/2013 | Bouchard | A63F 9/0612 463/9 |
| 2014/0077454 A1 | * | 3/2014 | Lapstun | A63F 13/005 273/153 S |
| 2015/0375104 A1 | * | 12/2015 | Nishar | A63F 13/12 463/9 |
| 2016/0303470 A1 | * | 10/2016 | Diamond | A63F 9/06 |
| 2017/0148345 A1 | * | 5/2017 | Dickerson | G09B 19/0038 |

* cited by examiner

*Primary Examiner* — Seng Heng Lim
(74) *Attorney, Agent, or Firm* — Christopher J. Barden (57) ABSTRACT

Among other things, in general, a permutation puzzle game is provided whose object is to arrange a set of tiles in a prescribed arrangement, starting from an initial arrangement or a series of initial arrangements, using permitted game moves. Such a puzzle game can be played using physical tiles, or virtually upon a computer. Methods, systems, and computer-readable media related to permutation puzzle games are also provided.

20 Claims, 11 Drawing Sheets

PERMUTATION GAME

CROSS-REFERENCE TO RELATED APPLICATIONS

This application claims the benefit of U.S. Provisional Patent Application Ser. No. 62/359,237, filed Jul. 7, 2016, the contents of which are hereby incorporated by reference in their entirety.

BACKGROUND

Whether played as a solitaire, cooperatively, or against other players, puzzle games have long been a popular pastime. One common genus of puzzle games is the permutation puzzle game, which concerns the transformation of a start permutation of items into one or more permutations that "solve" the puzzle, using one or more kinds of legal game moves.

For example, one well-known, three-dimensional permutation puzzle game is presented as a cube with six faces of nine colored "tiles" each, the tiles being arranged in a square upon each face and each tile displaying one of six colors. Players begin play from a "scrambled" start arrangement where each face displays tiles of multiple colors. Players then produce new arrangements of tiles by rotation clockwise or counterclockwise on one of six axes within the cube, and the objective is to obtain an arrangement of tiles such that each face is uniformly colored by one of the six respective colors. Performance in solving the puzzle can then be scored based on the time taken or the number of moves used by a player, among other criteria.

The number of different kinds of permutation games is limited only by human ingenuity. There remains significant demand for new permutation games for entertainment.

SUMMARY

In general, in an aspect, a puzzle gaming system for amusement of a user is provided, the system having computer-readable instructions that implement a game window upon a computer display, where the game window has a set of locations corresponding to triple coordinates (x, y, z) and a set of tiles each correspondingly placed upon those locations, the instructions also implementing a user-controllable action that when activated allows for horizontal moves between all pairs of tiles (x, 1 . . . m, z) and (x', 1 . . . m, z') where m is the maximum value of the y coordinate or for vertical moves between all pairs of tiles (1 . . . n, y, z) and (1 . . . n, y', z') where n is the maximum value of the x coordinate. Implementations may include one or more of the following. The instructions also include one or more arrangements of tiles to be displayed at game start and a memory (e.g., an array of predetermined value or reference to stored data) comprising one or more corresponding arrangements of tiles that connote the end condition, the instructions providing for an indicium signifying a game win once the game window displays the arrangement of tiles found in the memory that connotes that end condition for the arrangement of tiles displayed at game start. At least two of the tiles are identical in appearance. The gaming system has a touch-screen and the user-controllable action is activated by the user through touch. The tiles are represented using graphical content. The instructions also provide for calculating a game score. The set of locations is displayed within a two-dimensional grid of cells, the grid having columns and rows, each cell being subdivided into an equal number of ordered positions, with each location corresponding to a triple of coordinates (x, y, z) being displayed at position z within the cell in column x and row y of the grid. The tiles are represented from features selected from colors, images, textures, letters, or shapes. The tiles are represented from one or more user-supplied images. The user-controllable action causes multiple tiles to move simultaneously. A cursor is provided indicating the title that would be chosen if the action is activated. The arrangement of tiles at game start is subject to a solvability criterion, but otherwise random. The arrangement of tiles may be returned to game start by a user restart action or may be randomized again by a user re-randomize action, either of which may also result in the game score being reset. An undo action is provided for the user that also reverses the game score to its previous value. A button is provided that controls whether the user-selected action will be horizontal move or vertical move. The button displays which move type is currently selected (e.g., by way of a bar emanating from either side of the button indicating the move type). A series of game start conditions are provided in which the instructions provide for switching to another game start condition in the series. The series is ordered by difficulty. The next game in the series begins upon the previous game end. A network connection attached to a network is also provided in which the indicium for game win (e.g., puzzle or series solution) includes a dialog box that queries whether the user(s) would like to share the game score on the network. Share instructions are provided for sharing the game score on the network via the network connection.

In general, in an aspect, a method for amusement of a user is provided, the method including providing an arrangement of tiles corresponding to triple coordinates (x, y, z) at game start, providing an arrangement of tiles desired at game end, and providing a set of game rules explaining legal moves, the legal moves consisting of horizontal moves and vertical moves, in which the horizontal move requires the user to choose a move from (x, z) to (x', z') and swap all m pairs of tiles corresponding to (x, 1 . . . m, z) and (x', 1 . . . m, z') and in which the vertical move requires the user to choose a move from (y, z) to (y', z') and swap all n pairs of tiles corresponding to (1 . . . n, y, z) and (1 . . . n, y', z'). Implementations may include one or more of the following. The instructions also include one or more arrangements of tiles for use at game start and the corresponding arrangements of tiles that illustrate how the puzzle is to appear at game end. At least two of the tiles are identical in appearance. The instructions also provide for calculating a game score. The instructions provide that a set of locations is displayed within a two-dimensional grid of cells, the grid having columns and rows, each cell being subdivided into an equal number of ordered positions, with each location corresponding to a triple of coordinates (x, y, z) being displayed at position z within the cell in column x and row y of the grid. The tiles are represented from features selected from colors, images, textures, letters, or shapes. The method also includes providing a button that indicates whether the user-selected action will be horizontal move or vertical move.

These and other features and aspects, and combinations of them, may be expressed as methods, systems, components, means and steps for performing functions, apparatus, articles of manufacture, compositions of matter, and in other ways.

Other advantages and features will become apparent from the following description and claims.

DESCRIPTION

FIG. 5 shows a "flip" between the permitted kinds of moves, illustrated by a move type button/bar (left to right signifying horizontal moves) at FIG. 5A and the resulting flip to a move type button/bar (top to bottom signifying vertical moves) at FIG. 5B.

FIG. 6 shows the process of a horizontal move before (FIG. 6A), during (FIG. 6B), and after (FIG. 6C) the move, in puzzle game systems that allow dragging of pieces to effect the move.

FIG. 7 shows the process of a vertical move before (FIG. 7A), during (FIG. 7B), and after (FIG. 7C) the move, in puzzle game systems that allow dragging of pieces to effect the move.

PARTS LEGEND

Figure 1:
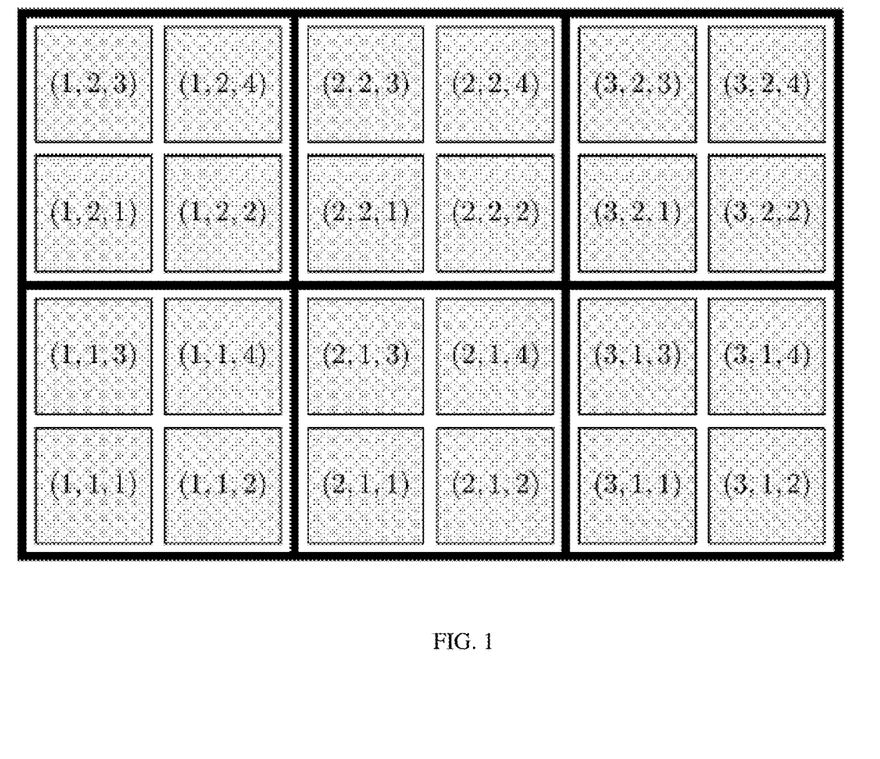
FIG. 1 shows an example layout of locations for a puzzle instance with n=3 columns, m=2 rows, and k=4 positions within each cell. This layout contains 6 cells and 24 locations. Cell outlines are shown as heavy lines, and the locations are shown in light gray. Each location is labeled with its coordinates (x, y, z).
Figure 2A:
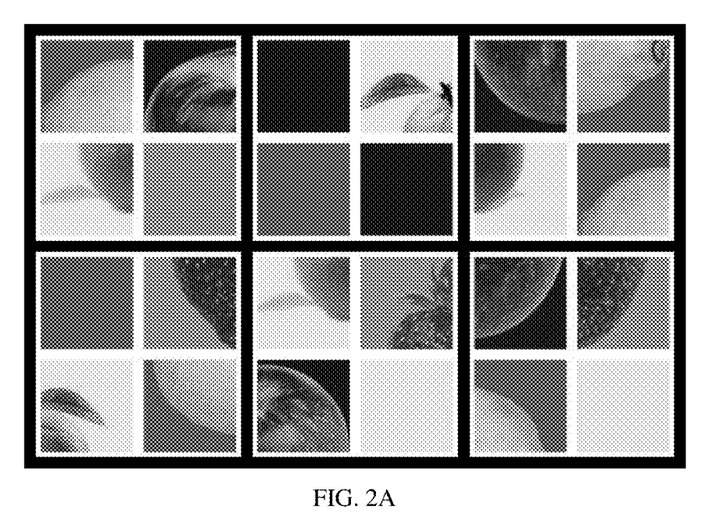
FIG. 2A shows an example layout of an initial arrangement (tiles to be displayed at game start).
Figure 2B:
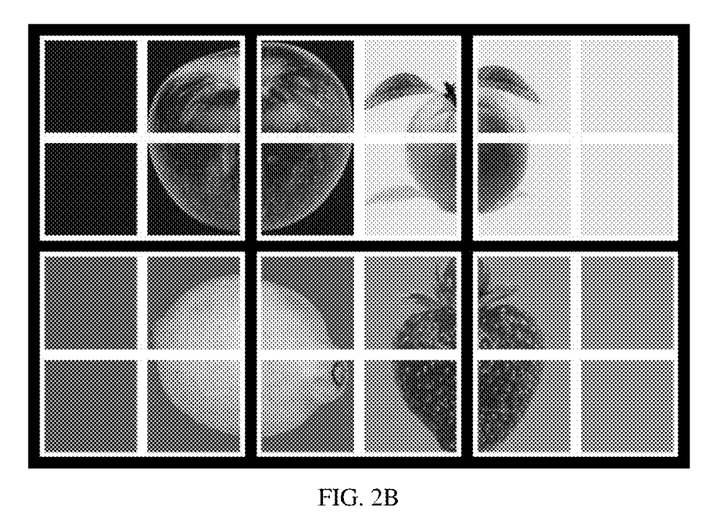
FIG. 2B shows an example layout of a target arrangement (tiles that connote the end condition).

100 Puzzle gaming system
102 Computer having a display, as well as input devices e.g., touch-screen
104 Player
106 Tile
108 Network (e.g., cloud-based or client-server)
110 Display view
112 Game window containing grid of rectangles
114 Cursor
116 Previous puzzle button
117 Next puzzle button
118 Re-randomize (re-shuffle) button
120 Help button
122 Move type button/bar
123 User directions
124 Game score display
126 Move counter
128 Flip counter
130 Thumbnail of current target arrangement We herein describe a puzzle and implementations thereto, whose object is to arrange a set of objects in a prescribed arrangement, starting from various initial arrangements. The objects may only be moved according to a specified set of rules. An instance of the puzzle can be mathematically constructed as follows:

1. Provide a triple of positive integers n, m, and k and let L=n×m×k;
2. Provide a set of L objects that are not all identical in appearance; and
3. Provide a set of L locations such that each location can be uniquely associated with a triple of coordinates (x, y, z), where $x \in \{1, \ldots, n\}$, $y \in \{1, \ldots, m\}$, $z \in \{1, \ldots, k\}$. For ease of reference, and without loss of generality, we will refer to coordinate x as a "column", to the coordinate y as a "row", to the pair of coordinates (x,y) as a "cell", and to the coordinate z as a "position within a cell". See FIG. 1 for an example.
4. Provide a particular arrangement of tiles, called the "initial arrangement", that is the basis for game start. See FIG. 2A for an example.
5. Provide another particular arrangement of tiles, called the "target arrangement", that is related to the initial arrangement by a solvability condition. See FIG. 2B for an example.

Given an instance of the puzzle that has an initial state corresponding to the initial arrangement, a player's goal is to transform the initial arrangement into the target arrangement (or an arrangement of tiles equivalent to the target arrangement) by using only permitted game moves as defined below.

Performing a game move has the result of performing a permutation of the tiles. There are two kinds of permitted moves: horizontal moves and vertical moves.

Figure 3A:
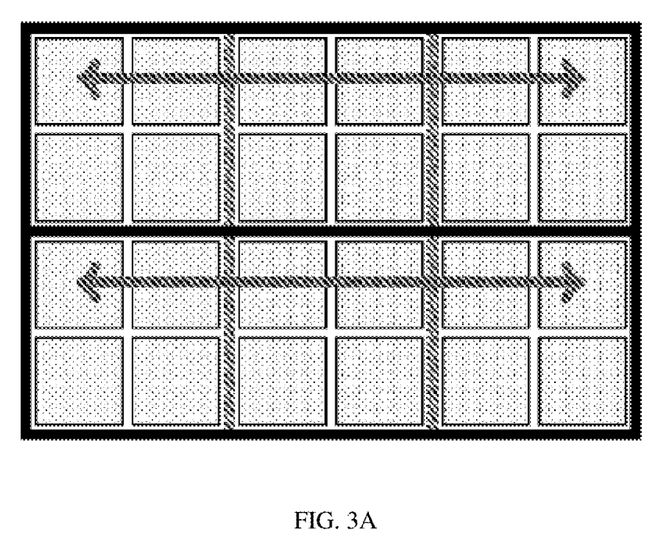
FIG. 3A shows an example of a horizontal move with (x, z)=(1, 3) and (x', z')=(3, 4), resulting in swapping tile pairs (1, 1, 3), (3, 1, 4) and (1, 2, 3), (3, 2, 4).

In a horizontal move, a player picks two pairs of coordinates (x, z) and (x', z'), where x, $x' \in \{1, \ldots, n\}$ and z, $z' \in \{1, \ldots, k\}$. All tiles (x, b, z) and (x', b, z') are then swapped for all $b \in \{1, \ldots, m\}$; i.e., (x, 1, z) and (x', 1, z') are swapped, (x, 2, z) and (x', 2, z') are swapped, and so on through (x, m, z) and (x',m, z'). See FIG. 3A for an example.

Figure 3B:
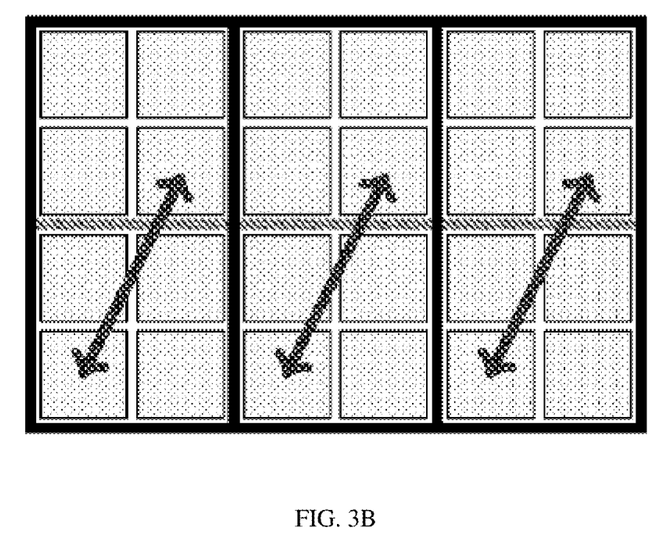
FIG. 3B shows an example of a vertical move with (y, z)=(1, 1) and (y', z')=(2, 2), resulting in swapping tile pairs (1, 1, 1), (1, 2, 2); (2, 1, 1), (2, 2, 2); and (3, 1, 1), (3, 2, 2).

In a vertical move, a player picks two pairs of coordinates (y, z) and (y', z'), where y, $y' \in \{1, \ldots, m\}$ and z, $z' \in \{1, \ldots, k\}$. All tiles (b, y, z) and (b, y', z') are then swapped for all $b \in \{1, \ldots, n\}$; i.e., (1, y, z) and (1, y', z') are swapped, (2, y, z) and (2, y', z') are swapped, and so on through (n, y, z) and (n, y', z'). See FIG. 3B for an example.

In some embodiments, the objects are physical tiles provided within a physical puzzle game that are directly manipulable by a user. In some embodiments, the objects are virtual tiles 106 provided within a virtual puzzle game 100 that is represented in a window 112 of a graphical user interface 110 running upon a computer 102, and the tiles are manipulable by a user 104 using input methods of the computer 102, e.g., by mouse, keyboard, or touch. In some embodiments, each object's appearance is signified by a color, image, texture, shape, letter, sound, or some other indicium recognizable by a user. In some embodiments associated primarily with visual indicia, objects are of equal or similar size, that is, they occupy equal area or volume with respect to each other (either physically or as depicted within a graphical user interface). In some embodiments associated primarily with aural indicia, objects are of equal or similar duration, though they may differ in volume, pitch, timbre, or in other ways. In some embodiments, the set of objects includes multiple objects that share the same appearance; though the set should not consist entirely of objects sharing the same appearance since that would be of limited entertainment value. For ease of description and without limiting generality, objects are sometimes generically referred to herein as "tiles".

In some embodiments, a set of L locations is displayed in a grid of m×n cells in m rows and n columns, with k positions within each cell. See for example FIG. 1, which illustrates a possible layout for the case n=3, m=2, k=4. In some embodiments, locations are laid out in three dimensions.

We use the term "arrangement of tiles" herein to denote an assignment of L tiles within the set of objects to corresponding L locations within the set of locations. If A is an arrangement of tiles, we denote the tile assigned to location (x, y, z) within A as A(x, y, z). Two arrangements A and B are referred to herein as "equivalent" if they are indistinguishable by appearance, i.e., if for each location (x, y, z), the tiles A(x, y, z) and B(x, y, z) have identical appearance.

In some embodiments, more than one arrangement is equivalent to the target arrangement, and each is related to the initial arrangement by a solvability condition. For example, in FIG. 2B, the tiles at locations (1,1,1) and (1,1,3) have the same appearance and would be indistinguishable for the purpose of determining whether the puzzle has been solved. In some embodiments, the procedure for determining whether the puzzle has been solved comprises comparing the current state of the puzzle to the target arrangement. In some embodiments, the procedure for determining whether the puzzle has been solved comprises comparing the current state of the puzzle to the target arrangement and all equivalent arrangements. In some embodiments, the procedure for determining whether the puzzle has been solved comprises determining whether the current state of the puzzle is equivalent to the target arrangement.

Figure 5A:
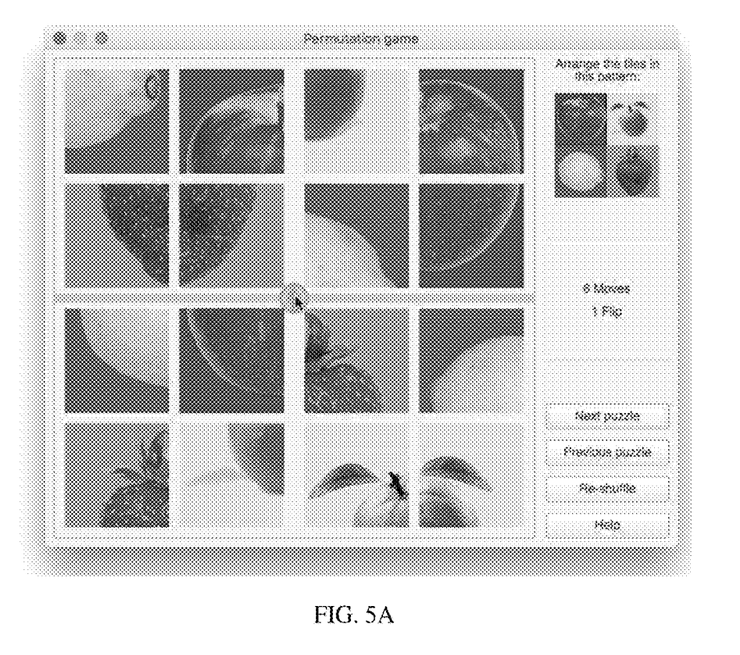
Figure 5B:
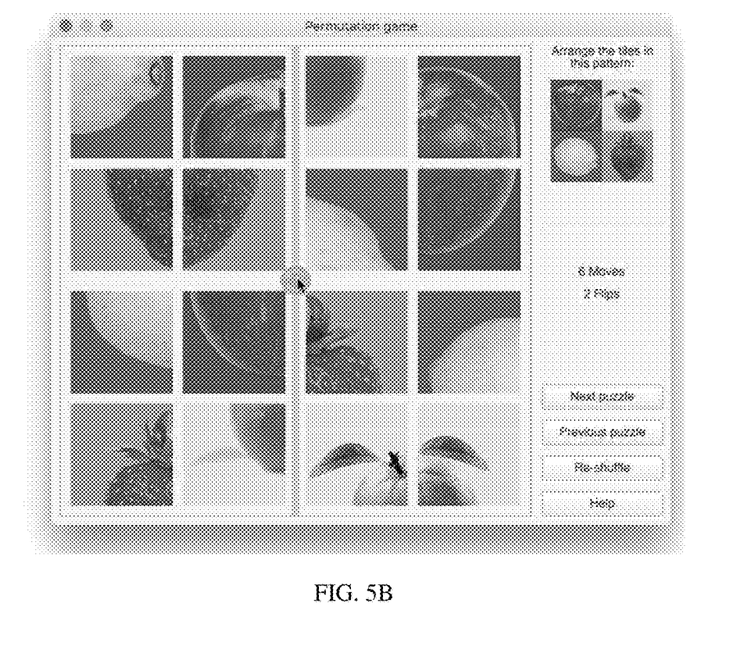

In some embodiments, a player's performance in solving a particular puzzle instance may be scored according to one or more metrics. In some embodiments, the metric comprises the number of moves used to solve the puzzle. In some embodiments, the metric comprises the number of "flips" used to solve the puzzle, in which a "flip" occurs when a horizontal move follows a vertical move, or a vertical move follows a horizontal move, as illustrated in FIG. 5. In some embodiments, the metric comprises the time taken to solve the puzzle.

For a given instance of a puzzle to be solvable, it is necessary and sufficient that there exists a sequence of permitted moves that takes the initial arrangement to the target arrangement (or to an arrangement equivalent to the target arrangement). We call this the "solvability criterion" or "solvability condition". In creating a puzzle instance, the initial arrangement can be constructed to meet the solvability criterion by applying a sequence of randomly chosen permitted moves upon the desired target arrangement and taking the resulting arrangement as the initial arrangement for the puzzle instance.

In some embodiments, a player may solve a series of puzzle instances, either sequentially, or as selected from among different puzzle instances by a player. The instances may, for example, differ in the values of n, m, and/or k; in the shape or appearances of the tiles; in the layout of the locations; and/or in the initial and target arrangements. In some embodiments, puzzle instances are created at random. In some embodiments, puzzle instances are selected from pre-configured puzzle instances. In some embodiments, puzzle instances may be rated according to their respective difficulties, and the series of instances are presented in order of increasing difficulty.

In some embodiments, computer-readable instructions for a puzzle game provide an "undo" feature permitting a player to undo recent moves in reverse order. In some embodiments, the game score is impacted by use of the undo feature. In some embodiments, use of the undo feature decreases associated performance metrics affecting the game score, such as number of moves or number of flips.

In some embodiments, a computer 102 is attached to a network 108, and the network 108 enables the sharing of game scores among different users of the puzzle game system. In some embodiments, users are queried as to whether they wish to share their game score on the network 108 upon solving a puzzle or puzzle series.

Other design variations are possible.

EXAMPLE

Figure 4:
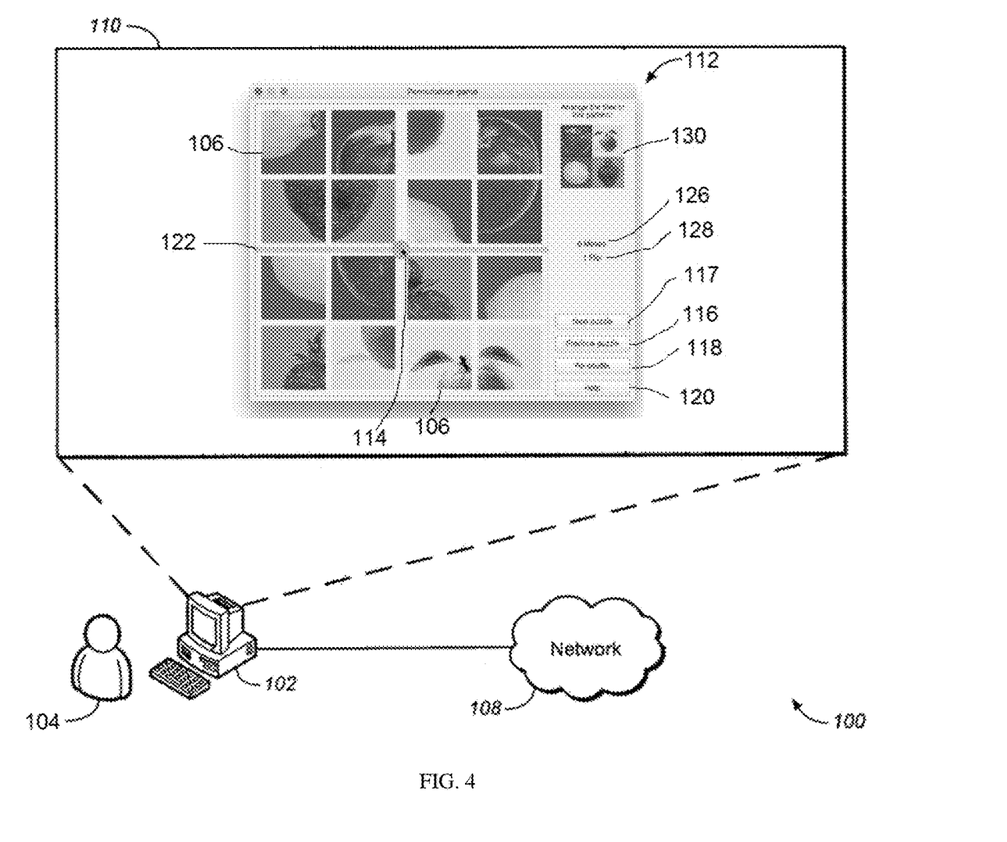
FIG. 4 shows an example puzzle gaming system.

A prototype software implementation was created as a demonstration of one possible embodiment of the puzzle and is illustrated as part of a puzzle gaming system in FIG. 4. Screenshots from the prototype software implementation are shown in FIGS. 5-11.

Figure 6A:
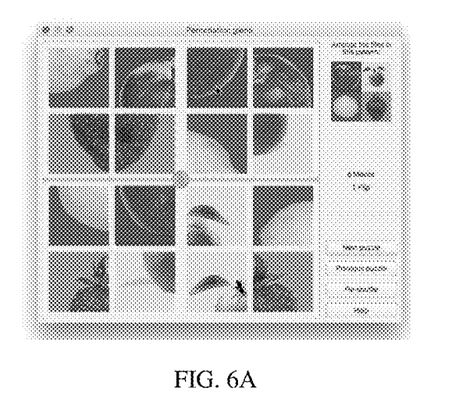
Figure 6B:
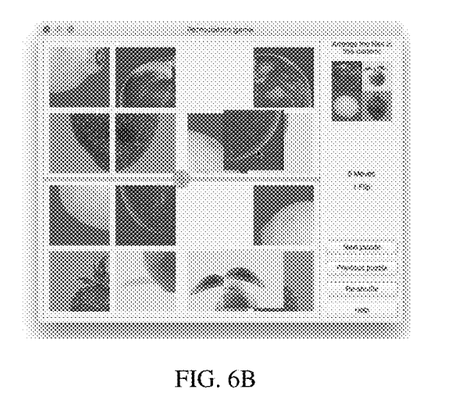
Figure 6C:
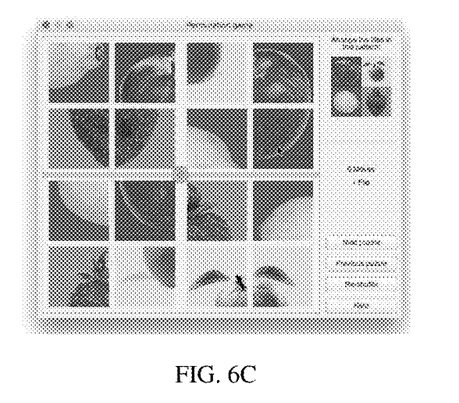
Figure 7A:
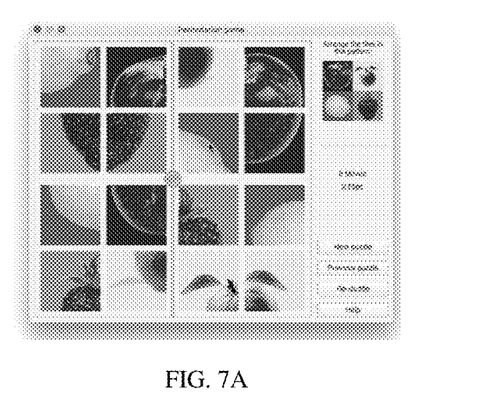
Figure 7B:
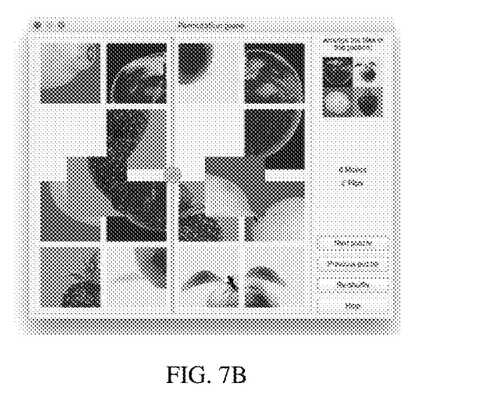
Figure 7C:
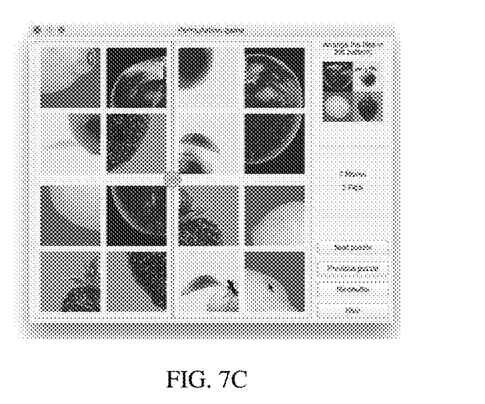
Figure 8A:
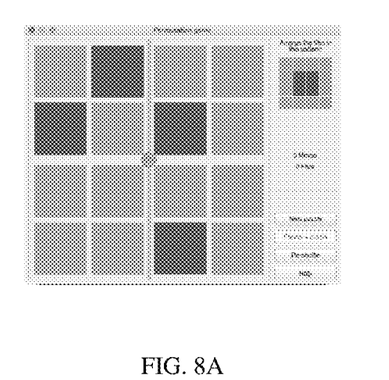
FIGS. 8A, 8B, and 8C show screenshots from an example puzzle game system.
Figure 8B:
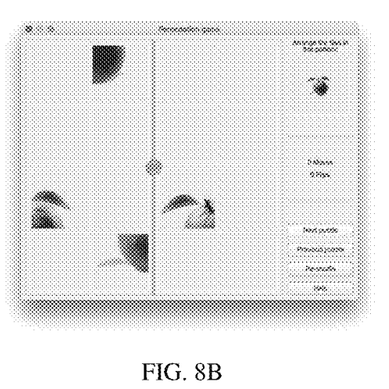
Figure 8C:
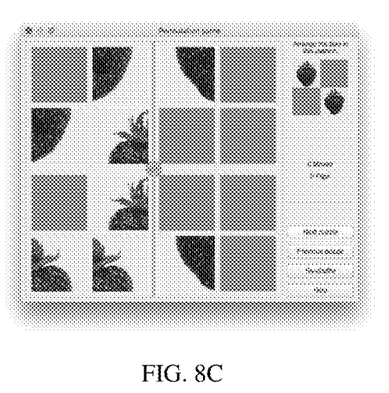
Figure 9A:
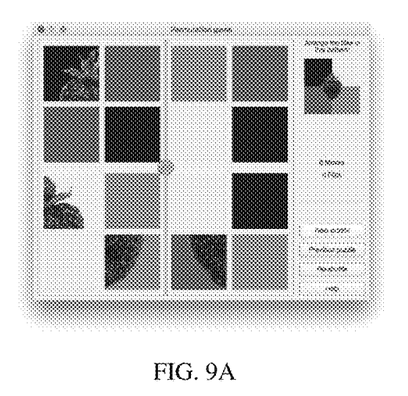
FIGS. 9A, 9B, and 9C show screenshots from an example puzzle game system.
Figure 9B:
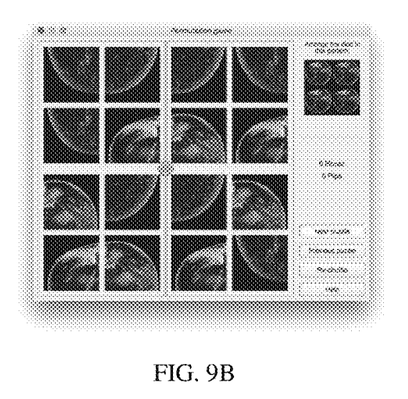
Figure 9C:
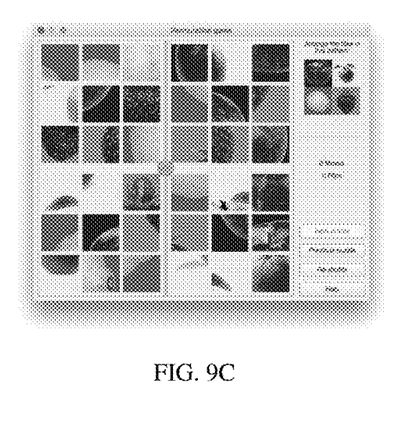

In the prototype software embodiment, the target arrangement is shown as a thumbnail image 130 in the upper right corner of the main application window. Horizontal or vertical mode is indicated by a gray divider 122 that is either a horizontal or vertical bar and also contains a button in the center of the layout. Pressing the button results in changing the orientation of the bar and is used to flip between horizontal and vertical modes as shown in FIG. 5. A horizontal move is performed by dragging a tile in any row of cells from its old location to its new location; the corresponding tiles in other rows move simultaneously. A horizontal move is shown in FIG. 6. A vertical move is performed by dragging a tile in any column of cells from its old location to its new location; the corresponding tiles in other columns move simultaneously. A vertical move is shown in FIG. 7.

In the prototype software embodiment, buttons in the main application window further permit the player to move between different puzzle instances. Some of the puzzle instances provided by this software implementation are shown in FIGS. 8A, 8B, 8C, 9A, 9B, and 9C.

Figure 10:
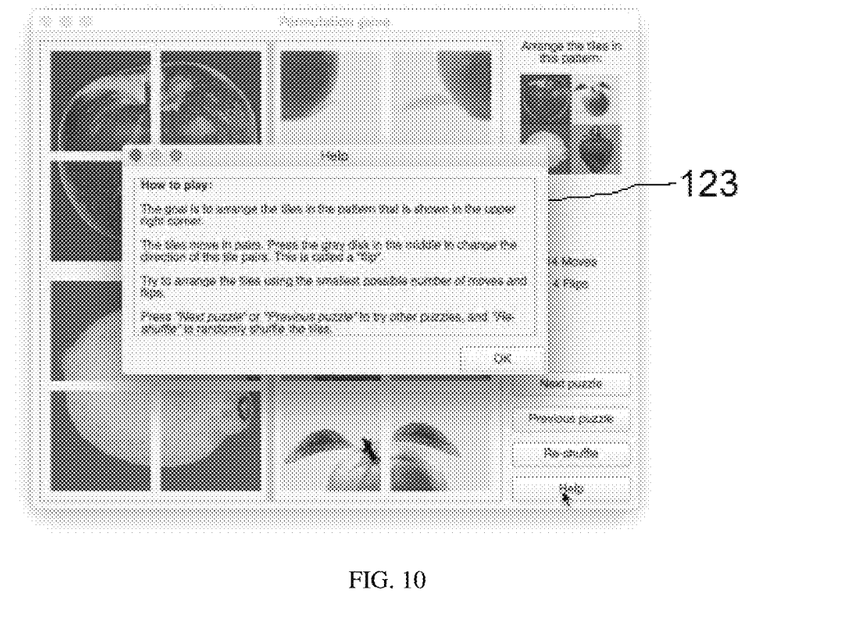
FIG. 10 shows an example puzzle game system featuring player directions.
Figure 11:
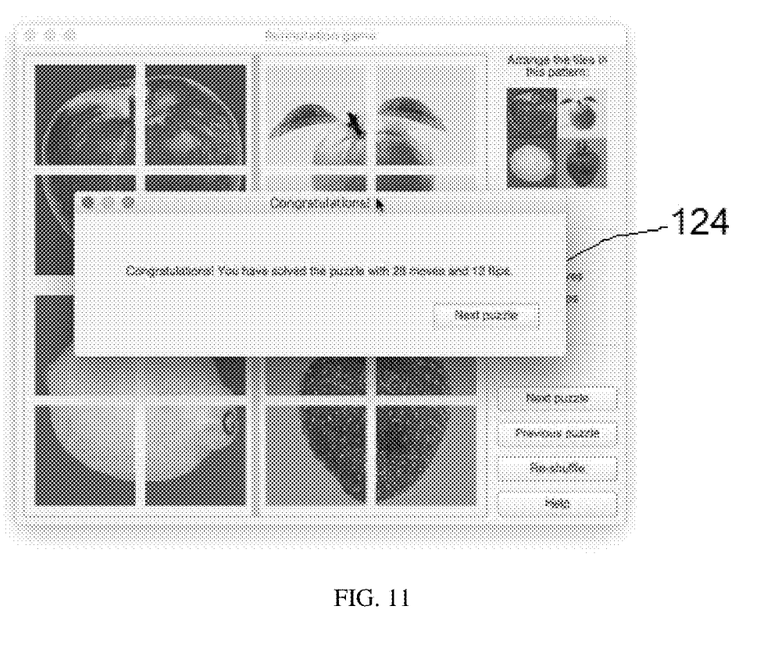
FIG. 11 shows an example puzzle game system upon solving a puzzle.

In the prototype software embodiment, a button 118 is provided for creating a new random initial arrangement for the current puzzle instance. In the prototype software embodiment, buttons 116, 117 are provided for moving between puzzle instances within a series. Counters for moves 126 and flips 128 are continuously shown, and the flip counter 128 decreases to its previous value if a second flip is performed immediately after a flip. A help button 120 brings up user directions 123 explaining how the game is played, as shown in FIG. 10. When the player has solved the puzzle, a game score display 124 is shown informing the winner of the number of moves and flips used, and providing an option to move to the next puzzle instance, as shown in FIG. 11.

The invention claimed is:

1. A two-dimensional puzzle gaming system for amusement of a user,
    the system comprising computer-readable instructions that implement a game window upon a computer display,
    the game window having a set of locations displayed within a two-dimensional grid of cells displayed as x columns and y rows, each cell being subdivided into an equal number of z ordered positions
    and a set of tiles correspondingly placed such that each location is occupied by only one tile,
    the instructions further comprising a user-controllable action that when activated allows for a move selected from a horizontal move from column x and ordered position z to new column x' and ordered position z', and a vertical move from row y and ordered position z to new column y' and ordered position z',
    in which the horizontal move results in the game window simultaneously swapping all m pairs of tiles corresponding to ordered position z of (x, b) of the grid and new ordered position z' of (x',b) of the grid where b=1 to m, and in which the vertical move results in the game window simultaneously swapping all n pairs of tiles corresponding to ordered position z of (b, y) of the grid and new ordered position z' of (b, y') of the grid where b=1 to n.

2. The system of claim 1 in which the instructions further comprise one or more scrambled arrangements of tiles to be displayed at game start and a memory comprising one or more equivalent unscrambled arrangements of tiles that connote the end condition, the instructions providing for an indicium signifying a game win once the game window displays the arrangement of tiles found in the memory that connotes that end condition for the arrangement of tiles displayed at game start wherein the instructions compare all tiles in the one or more scrambled arrangements of tiles to the one or more equivalent unscrambled arrangements that connote the end condition.

3. The system of claim 1 in which at least two of the tiles are identical in appearance.

4. The system of claim 1 in which the gaming system comprises a touch-screen and the user-controllable action is activated by the user through touch.

5. The system of claim 1 in which the tiles are represented using graphical content.

6. The system of claim 2 further comprising instructions for calculating a game score.

7. The system of claim 1 in which the tiles are represented from features selected from colors, images, textures, letters, or shapes.

8. The system of claim 7 in which the tiles are represented from one or more user-supplied images.

9. The system of claim 1 in which the user-controllable action causes multiple tiles to move simultaneously.

10. The system of claim 1 further comprising a cursor indicating the tile that would be chosen if the action is activated.

11. The system of claim 2 in which the arrangement of tiles at game start is subject to a solvability criterion, but otherwise random.

12. The system of claim 2 in which the arrangement of tiles may be returned to game start by a user restart action.

13. The system of claim 2 in which the arrangement of tiles may be randomized again by a user re-randomize action.

14. The system of claim 13 in which the game score is reset following the re-randomize action.

15. The system of claim 1 further having a user undo action that reverses the most recent move.

16. The system of claim 15 in which the undo action also reverses the game score to its previous value.

17. The system of claim 1 further comprising a button that controls whether the user-selected action will be horizontal move or vertical move.

18. The system of claim 17 in which the button displays which move type is currently selected.

19. The system of claim 2 comprising a series of game start conditions and in which the instructions comprise switching to another game start condition upon the previous game end.

20. The system of claim 19 in which the series is ordered by difficulty.

* * * * *